United States Patent [19]
Wilson et al.

[11] Patent Number: 6,065,688
[45] Date of Patent: May 23, 2000

[54] MASS-FLUX ACTUATOR WITH HIGH FREQUENCY RESPONSE

[75] Inventors: Kenneth J. Wilson; Timothy P. Parr; Robert A. Smith; Kenneth Yu; Klaus C. Schadow, all of Ridgecrest, Calif.

[73] Assignee: The United States of America as represented by the Secretary of the Navy, Washington, D.C.

[21] Appl. No.: 09/332,013

[22] Filed: Jun. 14, 1999

Related U.S. Application Data

[63] Continuation of application No. 09/040,189, Mar. 9, 1998, abandoned.

[51] Int. Cl.$^7$ ..................................................... B05B 1/08
[52] U.S. Cl. ........................................ 239/99; 251/129.06
[58] Field of Search ......................... 239/99, 101, 102.2, 239/4; 251/129.06

[56] References Cited

U.S. PATENT DOCUMENTS

| | | | |
|---|---|---|---|
| 3,465,732 | 9/1969 | Kattchee | 251/129.06 X |
| 4,628,330 | 12/1986 | Suga et al. | 251/129.06 X |
| 5,354,032 | 10/1994 | Sims et al. | 251/129.06 X |

FOREIGN PATENT DOCUMENTS

| | | | |
|---|---|---|---|
| 60-65971 | 4/1985 | Japan | 251/129.06 |
| 61-236974 | 10/1986 | Japan | 251/129.06 |

OTHER PUBLICATIONS

"Rainbow High Displacement Actuation" Brochure, Aura Ceramics.

*Primary Examiner*—Kevin Weldon
*Attorney, Agent, or Firm*—David Kalmbaugh

[57] ABSTRACT

The present invention relates to an electric valve capable of producing periodic mass-flow modulation of a gaseous, liquid, or mixed-phase medium over wide ranges of frequencies, pressure, and flow rates. Such mass-flow modulation can be used to periodically shed large-scale vortices at the outlet and to manipulate their dynamics allowing the user to actively control fluid mixing and transport further downstream. The device has a piezoelectric wafer that in a relaxed state abuts the upstream end of the outlet tube separating the pressurized fluid in the plenum with the outlet. The device has an apparatus for applying electric field to the wafer, which distorts the wafer and ruptures the seal forming a throat area that controls the fluid mass flux. Due to the fast response of the piezoelectric material to an electric field, the throat area can be modulated rapidly in time making the device operable even at high frequencies. The present invention is particularly useful for actively controlling fuel-air mixing in a combustor. However, it may be utilized in other applications such as in medical drug administration for inhalation therapy.

12 Claims, 9 Drawing Sheets

MASS-FLUX ACTUATOR WITH HIGH FREQUENCY RESPONSE

This application is a continuation of U.S. patent application Ser. No. 09/040,189, filed Mar. 09, 1998 now abandoned.

The invention described herein may be manufactured and used by or for the government of the United States of America for governmental purposes without the payment of any royalties thereon or therefor.

BACKGROUND OF THE INVENTION

1. Field of the Invention

The present invention relates to a device and method that rapidly regulate fluid mass-flow over wide ranges of pressures and flow-rates. More particularly, the present invention relates to periodically modulating large amounts of gaseous or liquid mass-flow over a wide range of frequencies for the purpose of controlling the rate of turbulent mixing with another fluid. Most particularly, the present invention is an improved device and method which set up periodic mass-flow oscillations in an air or fuel jet to improve the combustion efficiencies of various combustion devices such as incinerators or jet engines.

2. Brief Description of the Related Art

In a jet of fluid that exits from a conduit to a surrounding medium of another fluid, sudden increase of the mass-flow leads to formation of well-defined vortices that dominate the boundary between the jet fluid and the surrounding fluid. Because these vortices help transport chunks of fluid over a large distance, the rate of turbulent mixing between the two fluids is closely linked to the dynamics of these vortices. One way to manipulate the dynamics of vortices is to modulate periodically the instantaneous mass-flux of the jet.

In combustion devices, actuators can be used to enhance combustion performance such as efficiency improvement, pollutant reduction, flammability extension, and instability suppression. Combustion apparatuses which use actuators have been disclosed in U.S. Pat. No. 5,428,951 (Wilson et al.). U.S. Pat. No. 5,428,951 discloses several active control devices including loudspeakers to modify the pressure field of the system or to obtain gaseous fuel flow modulations, pulsed gas jets aligned across a rearward facing step, adjustable inlets for time-variant change of the inlet area of a combustor, and solenoid-type fuel injectors for controlled unsteady addition of secondary fuel into the main combustion zone.

Active control of a compact waste incinerator has been disclosed in U.S. Pat. No. 5,361,710 (Gutmark et al.). Again, actuators were used to control burn rates within waste incinerators and affect the formation of soot or other emissions that result from standard combustion processes. This occurs with the synchronizing of the fuel injection with the intentional formation of large-scale vortices proximate to the entrance of the combustion chamber.

For actively controlling combustion, there have been several different types of actuators, which include acoustic drivers that generate pressure waves, electrodes and heating elements that use electric-energy dissipation, etc. One other type of actuators is based on modulating instantaneous mass-flux of reactants or of chemical catalyzer. For instance, electromechanical valves, electro-pneumatic valves, and magneto-strictive valves are examples of this type. In a practical device, however, an actuator has to perform over a wide range of frequencies, pressures, and flow rates to be useful. For instance in a compact waste incinerator, it is desirable to have an actuator which is able to perform in the range of frequencies between 20 and 2000 Hz, over pressures of 1 to 50 psig, and provide flow rate oscillations of at least 20 scfm (standard cubic feet per minute) to 100 scfm.

However, previously disclosed combustion systems have lacked active control devices which permit the formation of large-scale vortices in the practical ranges of operation. Additionally, the previously disclosed active control devices do not permit liquid transfers. There is a need in the art of combustion devices to provide large-scale vortices which permit combustion devices to function over a wide range of pressures, temperatures, frequencies and mass-flux rates. Additionally, there is a need for the responsiveness of active control devices to function with increased efficiencies, even at higher pressures, temperatures and mass-flux rates. Improved active control of combustion systems should also be reliable and relatively inexpensive.

Among those actuators previously listed, only an electro-pneumatic valve, which is known in the art as a Ling valve, has been able to come close to the restrictive requirement of practical combustion systems. The Ling valve comprises a plurality of interleaving stationary and magnetically movable slots that reciprocally allow passage of air through a pneumatic valve at rates and amounts defined by the electric field. The Ling valve is sold at a cost of approximately $16,000 under the trade name of EPT-1094, Electro-Pneumatic Transducer, which is manufactured by Ling Electronics Inc. of Anaheim, Calif. The Ling valve weights approximately 35 pounds, needs air cooling, and requires special inlet filters to protect the Ling valve from contamination because of the magnet field extracting ferrous particles from the fluids into the working parts of the Ling valve. The Ling valve may provide operating pressures of up to 40 psig and flow rates up to 400 scfm. The Ling valve is only operable in the low frequency range of 20 Hz to 400 Hz.

The device in the present invention is structurally different from the Ling valve. The present invention uses high-frequency-response characteristics of piezo-electric materials, large-displacement characteristics of vibrating wafers, and strategically placed valve-seat that maximizes the flow rate controllability. The device is operable over an increased range of frequencies and higher flow rates. Also, due to the simplicity of the parts and the construction design, the device is reliable and inexpensive. In combustion systems, the present device can be used to actively modulate not only the instantaneous mass-flux of the reactants within the range of specified frequencies but it can also modify mixing between fuel and oxidizer or between reactants and products by manipulating vortex dynamics of the fluid-mixing zone.

SUMMARY OF THE INVENTION

The present invention provides an active control device comprising an outlet conduit having a first end and second end, which is capable of fluid flow therethrough between the first and second ends with the fluid entering the outlet conduit through the second end and exiting through the first end; a piezoelectric wafer having a first and second side, with the first side of the wafer abutting the second end of the outlet conduit when the wafer is placed either in a relaxed state or in an equilibrium state under an applied electric field, and preventing fluid passage into the outlet conduit; a fluid receptacle forming a chamber containing the wafer and the second end of the outlet conduit, and with an inlet opening through which pressurized fluid can be brought into the chamber; and, means for applying an electric field to the wafer, wherein the application of the electric field to the wafer is capable of distorting the wafer and creating a gap between the first side of the wafer and the second end of the outlet conduit.

The present invention further provides a method for controlling combustion A method for controlling mass-flux comprising the steps of providing an active control device comprising an outlet conduit having a first end and second end, which is capable of fluid flow therethrough between the first and second ends with the fluid entering the outlet conduit through the second end and exiting through the first end, a piezoelectric wafer having a first and second side, with the first side of the wafer abutting the second end of the outlet conduit when the wafer is placed either in a relaxed state or in an equilibrium state under an applied electric field, and preventing fluid passage into the outlet conduit, a fluid receptacle forming a chamber containing the wafer and the second end of the outlet conduit, and with an inlet opening through which pressurized fluid can be brought into the chamber, and means for applying an electric field to the wafer, wherein the application of the electric field to the wafer is capable of distorting the wafer and creating a gap between the first side of the wafer and the second end of the outlet conduit; supplying a pressurized fluid into the fluid chamber; and, applying an electric field to the wafer, wherein the wafer is distorted.

Additionally, the present invention provides a method for controlling combustive fluids comprising the steps of providing an active control device comprising an outlet conduit having a first end and second end, which is capable of fluid flow therethrough between the first and second ends with the fluid entering the outlet conduit through the second end and exiting through the first end, a piezoelectric wafer having a first and second side, with the first side of the wafer abutting the second end of the outlet conduit when the wafer is placed either in a relaxed state or in an equilibrium state under an applied electric field, and preventing fluid passage into the outlet conduit, a fluid receptacle forming a chamber containing the wafer and the second end of the outlet conduit, and with an inlet opening through which pressurized fluid can be brought into the chamber, and means for applying an electric field to the wafer, wherein the application of the electric field to the wafer is capable of distorting the wafer and creating a gap between the first side of the wafer and the second end of the outlet conduit; supplying a pressurized combustive fluid into the fluid chamber; and, applying an electric field to the wafer, wherein the wafer is distorted.

DETAILED DESCRIPTION OF THE PREFERRED EMBODIMENT

The present invention provides a device and method for controlling mass-flux within mixing chambers. The device regulates the instantaneous flow rate of a fluid medium over a wide range of frequencies and pressures. In combustion systems, the device regulates the reactants flow to control the production, placement and stabilization of large scale vortices within the combustion chambers. Combustion characteristics can be enhanced with the devices that are used to synchronize the injection of fuel and air in a properly controlled manner. The present invention provides for improvements in frequency response, simplification, and reduced weight, bulk and cost. The regulation or active control of combustion within the combustion chamber may be used on waste incinerators, propulsion devices, and other similar combustion devices. Additionally, the device and method may be used for other application, such as medical drug administration for inhalation therapy.

Figure 1:
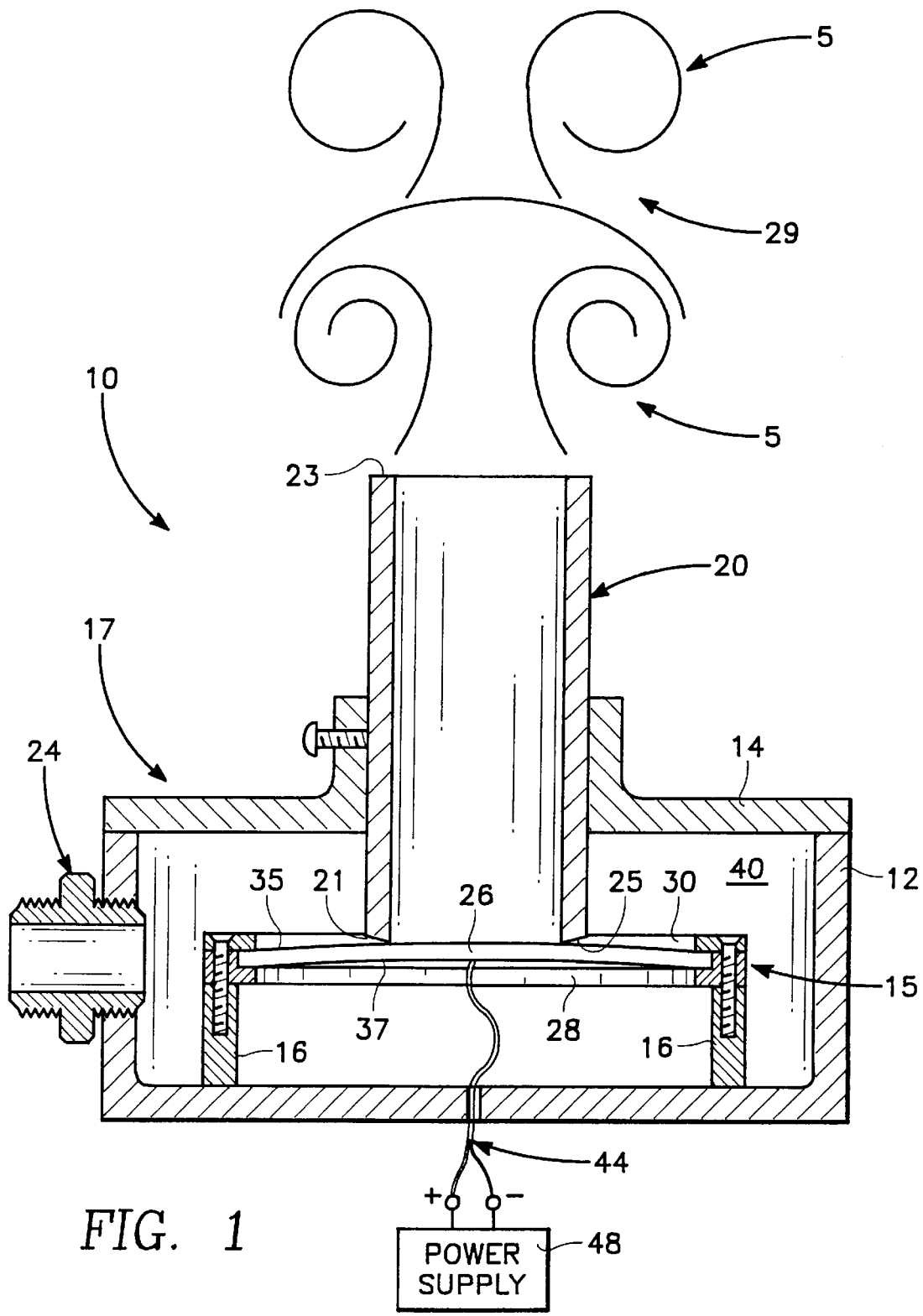
FIG. 1 is a side cross-sectional view of the active control device of the present invention.

As seen in FIG. 1, the present invention is an active control device 10, or actuator, which comprises a wafer 26. The wafer 26 comprises a piezoelectric substrate, which seals the end of an outlet conduit 20 when placed in a resting state or exposed to a certain level of electric field externally applied. The device 10 controllably restricts the amount of fluid that passes through a normally closed gap 21 that opens when a seal between the wafer 26 and outlet conduit 20 is broken by the application of an externally generated electrical current. The gap width is controlled continuously by time-dependent electric voltage applied to the wafer 26. Oscillating the level of the electric voltage causes the gap width to change periodically setting up periodic oscillations in the fluid mass-flow through the gap. This also causes the flow of air, fuel and/or other compressible and non-compressible fluids to shed large fluid kernels or vortices 5 upon exiting the outlet conduit 20. The vortex shedding coincides with the mass-flow oscillations at the outlet conduit 20. Repetitive shedding of the vortices 5 affects the rate of mixing with the surrounding fluid 29. This process occurs while the wafer 26 is exposed to relatively high fluid supply pressures and temperatures.

The outlet conduit 20 has a first end 23 and second end 25 and is capable of fluid flow. Fluid flow through the outlet conduit 20 occurs in the direction from the second end 25 to the first end 23. The outlet conduit 20 may comprise any shape which facilitates fluid flow, such as air, fuel, and/or other compressible and non-compressible fluids therethrough. Preferably the outlet conduit 20 comprises a circular, square, rectangular or oval shape tube with an adjustable length. More preferably, the outlet conduit 20 comprises a cylinder shape.

Preferably, the outlet conduit 20 comprises a non-conductive composition. The composition of the outlet conduit 20 may comprise materials which are resilient and may include but are not limited to materials such as polyvinylchloride, fluorocarbon resins, such as tetafluoroethylene, tetrafluoroethylene and hexafluoropropylene copolymers, and/or tetrafluoroethylene and perfluorinated vinyl ether copolymers, sold under the trademark Teflon(r), and other synthetic resins and/or plastic, sold under such trademarks as Bakelite(r). Preferably, the outlet conduit 20 comprises a polyvinylchloride composition.

The wafer 26 comprises a piezoelectric substrate that has a first side 35 and second side 37. The first side 35 of the wafer 26 abuts and seals the second end 25 of the outlet flow structure 20, when the wafer 26 is placed in a resting or equilibrium state, which occurs when a constant level of electric voltage is applied to the wafer 26. The wafer 26 has a fast response which stems from the high frequency characteristics of the piezoelectric material. While abutting the second end 25 of the outlet conduit 20, the wafer 26 functions as a valve to pressurized upstream fluids, either liquid or gas, entering a plenum chamber 40. The wafer 26 may be any shape which facilitates covering and opening the second end 25 of the outlet conduit 20. Preferably, the wafer 26 has a thin disc shape, more preferably the wafer 26 has the first side 35 which is configured as a dome shape abutting the second end 25 of the outlet conduit 20. Most preferably, the wafer 26 comprises a convex shape on the abutted side which aligns with a tapered shape along the second end 25 of the outlet conduit 20, and is capable of closing the gap 21 forming a seal.

The piezoelectric wafer 26 is designed to deform and change planar geometry in response to electromotive forces applied to the wafer 26. The wafer 26 comprises an electric-reactive material that may be either a polymeric or ceramic composition or mixtures thereof. The piezoelectric wafer 26 may comprise materials such as lead, zirconium, titanium, polyvinylidene fluoride (PVDF), and the like. Additionally, the wafer may be either monomorphic, bimorphic or multimorphic.

The wafer 26 may comprise a coating. Preferably, the wafer 26 comprises a non-conductive coating. More preferably, the coating is non-conductive and waterproof. Coatings may be selected from such chemical compositions as latex, enamel, varnish, and the like.

Preferably the wafer 26 is from about 0.5 inches in diameter or larger, and more preferably from about 4 inches in diameter to about 10 inches in diameter. Additionally, the wafer 26 comprises a high-displacement wafer. Preferably the wafer 26 is capable of axial displacement of from about 0.005 inches or greater, more preferably from about 0.05 inches to about 0.20 inches. For proper functioning, the pressures existing on the second side 37 of the wafer 26 are greater than the pressures on the first side 35 of the wafer 26. Preferably the wafer 26 is capable of functioning under pressures of from about 1 psi or greater, more preferably from about 1 psi to about 200 psi, still more preferably from about 1 psi to about 100 psi, and most preferably from about 50 psi to about 100 psi. Preferably the wafer 26 is responsive to direct or alternating currents of a wide range of frequencies, more preferably from about DC to about 2000 Hz.

The wafer 26 of the present invention preferably comprises a Rainbow® wafer. Rainbow wafers, sold under the trade name C3900, are manufactured by Aura Ceramics, Inc. of Minnesota, Minneapolis. The Rainbow wafers which are approximately four inches in diameter, may be distorted to 0.060 inches under fluid pressures of approximately 100 psi. The Rainbow® wafer used in the present invention has a thickness of 0.30 inches has a range of from about −200 volts to about +400 volts, or a 600 volt peak to peak range.

The device 10 may comprise a housing means 17 which supports both the wafer 26 and the outlet conduit 20 at a predetermined position relative to each other. Preferably, the housing means 17 defines a plenum structure 12 and a cover 14, which form a plenum chamber 40 capable of storing a quantity of pressurized fluid. The pressurized fluid is supplied into the chamber 40 through inlet ports 24 which can be connected to an external pressurized fluid source such as pressurized storage tanks, bottled gas, pumps, and/or other supply lines. The sealed second end 25 of the outlet conduit 20 is contained within the chamber 40, which permits fluid flow from the chamber 40 through the gap 21 into the outlet conduit 20 when the seal is broken, as the wafer 26 is distorted by a current. The outlet conduit 20 projects through the cover 14 in a predetermined locked position.

A series of inlet ports 24 are circumferentially disposed around the plenum structure 12. The inlet ports 24 are any standard tube connectors that permit the supply of pressurized fluid into the plenum structure 12. Preferably, the inlet ports 24 are threaded connectors for standard ¼ inch to 1-inch pipes. The fluid within the chamber 40 is pressurized to an amount that will supply the desired amount of mass-flux through the gap 21 when an electric power supply 48 applies a controlled voltage to the wafer 26.

The electric power supply 48 provides an electric current to the wafer 26. The wafer 26 deforms proportional to the applied voltage, and stays deformed until the voltage is removed. The power supply 48 has wires 44 which are routed through the plenum structure 10. The wires 44 are connected to the wafer 26 by any acceptable electrical connection, such as soldering, adhesion and the like, with conductive epoxies. The application of the electric field to the wafer 26 is capable of distorting and displacing the wafer 26 from the sealed end 25 of the outlet conduit 20. The current can be direct current (DC) or alternating current (AC). An alternating current is preferably from about 20 Hz or greater, more preferably from about 400 Hz or greater, and most preferably from about 400 Hz to about 2000 Hz. The electric signals may be of any time-variant combination to provide reversible polarities including sinusoidal, triangular, and direct current biased waveforms, and/or combinations thereof. In combustion control applications, AC voltage is regulated to the wafer 26 supplying the airflow and/or fuel flow to provide the optimum amounts of air and fuel at regulated intervals which improves the combustion performance.

Figure 2:
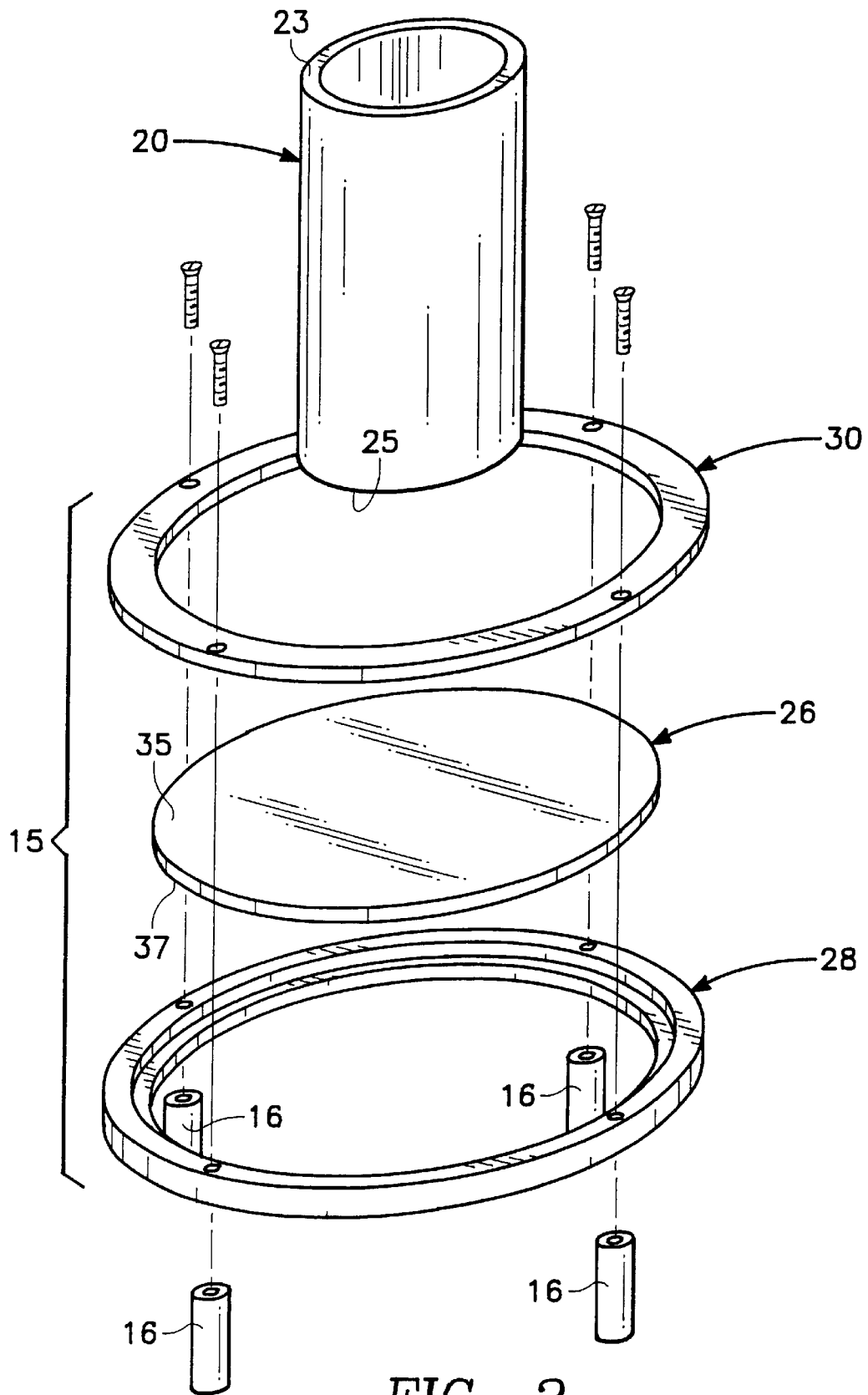
FIG. 2 is a diagram illustrating the assembly of the parts inside the housing structure.

As further shown in FIG. 2, the device 10 may further include a wafer support means 15 which comprises an upper 30 and lower ring 28, which are suspended inside the chamber 40 by multiple support rods 16 that are attached to the housing means 17. The wafer support means 15 supports the wafer 26 at a predetermined position relative to the outlet conduit 20. A plurality of screws and threaded fasteners not only hold the housing means 17 and the wafer support means 15 in place but they also ensure the relative position of the second end 25 of the outlet conduit 20 with respect to the first side 35 of the wafer 26 in the relaxed state.

Figure 3:
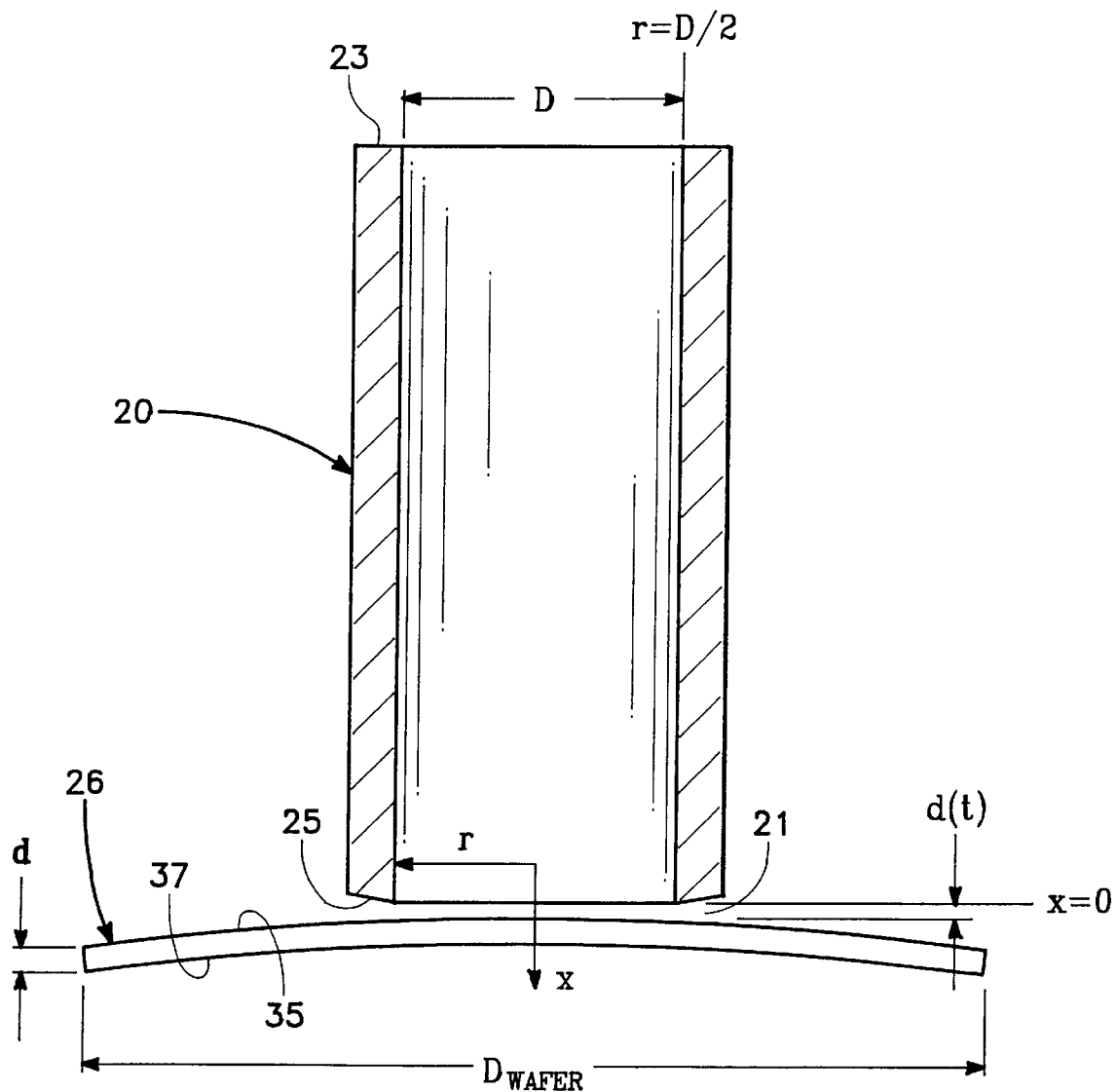
FIG. 3 is a side schematic view of the active control device of the present invention, with mathematical symbols that illustrate operational principles.

As illustrated in the schematic of FIG. 3, the operational principles of the device 10 are shown. The outlet conduit 20 with the inside diameter D is positioned over a wafer 26 with a diameter Dwafer. A gap 21 is formed between the first side 35 of the wafer 26 and the second end 25 of the outlet conduit 20 when an applied voltage distorts the piezoelectric wafer 26. The amount of wafer displacement is a function of the radial location r on the wafer first side 35 as well as of the applied voltage from the power supply 48 and the pressure loading inside the chamber 40. The piezoelectric wafer 26 provides the means to control the size, or width, of the displacement gap 21 temporally, even at high frequencies. When an electric field is applied to the wafer 26, the wafer 26 changes shape, producing a significant displacement in the normal direction x of the wafer 26. The displacement gap 21 displays a time variant functional displacement d(t) which depends on the voltage applied to the wafer 26. When the displacement gap is zero, the first side 35 of the wafer 26 touches the second end 25 of the outlet conduit 20 forming a seal and blocking fluid passage through the gap 21. When the gap 21 becomes positive with the change in the applied voltage to the wafer 26, a throat area A* is created through which the pressurized fluid in the plenum chamber 40 can flow into the outlet conduit 20. The maximum mass flux through the gap 21 is proportional to the throat area at a given pressure. The throat area A* is proportional to the inside diameter D of the outlet conduit 20 and the gap size $\delta(t)$, with A* being equal to $\pi D \delta(t)$. The amount of wafer displacement $\delta(t)$ from the equilibrium position is determined by the vibrational characteristics of the wafer 26 and the applied driving force. The interface between the wafer 26 and the outlet flow structure 20 allows the flow into the combustion chamber may be varied between zero and a maximum value, with is equal to the circumference of the outlet flow structure 20 multiplied by the maximum width of the gap 21.

The throat area A* for fluid passage is controlled by changing the amount of wafer displacement $\delta(t)$. The downward displacement of the wafer 26 surface creates a gap, $\delta(t)$, between the second end 25 of the fixed outlet conduit 20 and the first side 35 of the wafer 26. The amount of displacement is controlled by the electric field applied to the wafer 26. For a uniform thin circular plate going through symmetrical vibrations in the x direction as a result of a sinusoidal driving force from the power supply 48, the equation of motion may be written as:

$$\frac{\partial^2 x}{\partial t^2} + \frac{d^2 y}{12\rho(1-\sigma^2)} \nabla^2 (\nabla^2 x) = \text{Applied Force/unitmass} \quad (A)$$

The variables for the formulas herein include independent variables of t for time, r for radial direction from the center of the wafer 26, $\theta$ for azimuthal direction, $\omega$ for frequency in radian/sec, F for forcing amplitude; dependent variables of x for axial displacement of the wafer 26 normal to the surface at the center, A* or A*(t) for instantaneous throat area, dm/dt for instantaneous mass flux, $\Xi$ or $\Xi(r)$ for functional dependence of the axial displacement on r, $\delta$ or $\delta(t)$ for instantaneous gap width 21; mathematical operator and other known functions of $J_0$ for Bessel function, $I_0$ for modified Bessel function of the first kind, and $\nabla^2$ for Laplacian operator in polar coordinates:

$$\left( = \frac{\partial^2}{\partial r^2} + \frac{1}{r}\frac{\partial}{\partial r} + \frac{1}{r^2}\frac{\partial^2}{\partial \theta^2} \right)$$

;physical properties of $P_0$ for pressure in the plenum chamber 40, $T_0$ for temperature of the fluid in the plenum chamber 40, P* for pressure at the sonic condition (at the throat), U* for velocity of the fluid at the sonic condition, $\rho$* for density of the fluid at the sonic condition, e for specific heat ratio, $\rho$ for density of the wafer material; and other constants of R for universal gas constant, D for inside diameter of outlet conduit 20, d for thickness of the wafer 26, $D_{wafer}$ for diameter of the wafer 26, Y for Young's modulus, a for Poisson's ratio, and A, B for complex constants.

For periodic vibration $x = \Xi(r)e^{iwt}$ driven with a sinusoidal driving force, the equation reduces to:

$$\nabla^2(\nabla^2 \Xi) - K^4 = -F \text{ where } K^4 = \frac{12\omega^2 \rho(1-\sigma^2)}{d^2 y} \quad (B)$$

and F is the forcing amplitude.

The solution of the equation having finite amplitude displacement is:

$$\Xi = A J_0(Kr) + B I_0(Kr) + F/K_0 \quad (C)$$

where $J_0$ and $I_0$ are Bessel function and modified Bessel function of the first kind and A and B are complex constants to be determined by the boundary conditions at the clamping location, $r = D_{wafer}/2$.

The throat area is given by:

$$A^*(t) = \pi D \delta(t) = \pi D [x(r,t)) - x(r,0)]_{r=D/2} = \pi D \Xi(D/2)e^{iwt} \quad (D)$$

The time-dependent mass-flux through the gap is determined by the fluid type, pressure, and the throat area. For incompressible fluid, the mass flux modulation at the gap 21 translates directly to the flux modulation through the outlet conduit 20. For compressible fluid, the modulation at the interface is compounded by the acoustic resonance characteristics of the outlet conduit 20. An ability to adjust the length of the outlet conduit 20 allows one to tune the frequency response of the conduit for increased effectiveness. Mass flux through the device may be shown as a function of the displacement $\delta(t)$ for incompressible and compressible fluid flow. For both compressible and incompressible fluid, the mass flux is proportional to the gap width $\delta(t)$.

For incompressible fluid, Bernoulli equation may be used to calculate the velocity and then mass-flux:

$$P_0 = P* + \frac{1}{2}\rho * U*^2, \text{ yielding } U* = \sqrt{\frac{2(P_0 - P*)}{\rho*}} \quad (E)$$

with the mass-flux given by:

$$\frac{dm}{dt} = \rho * U * A*(t) = \pi D \sqrt{2\rho *(P_0 - P*)} \, \delta(t) \quad (F)$$

For compressible-fluid flow choked at the throat, isentropic flow relation can be used:

$$\frac{dm}{dt} = \rho * U * A*(t) = \rho_0 \left(\frac{2}{\gamma+1}\right)^{\frac{1}{(\gamma-1)}} \left(\frac{2\gamma}{\gamma+1}\right)^{\frac{1}{2}} \pi D \delta(t) \quad (G)$$

which yields:

$$\frac{dm}{dt} = \frac{\pi D P_0 \sqrt{\gamma}}{\sqrt{RT_0}} \left(\frac{2}{\gamma+1}\right)^{\frac{\gamma+1}{2(\gamma-1)}} \delta(t) \quad (H)$$

Figure 4:
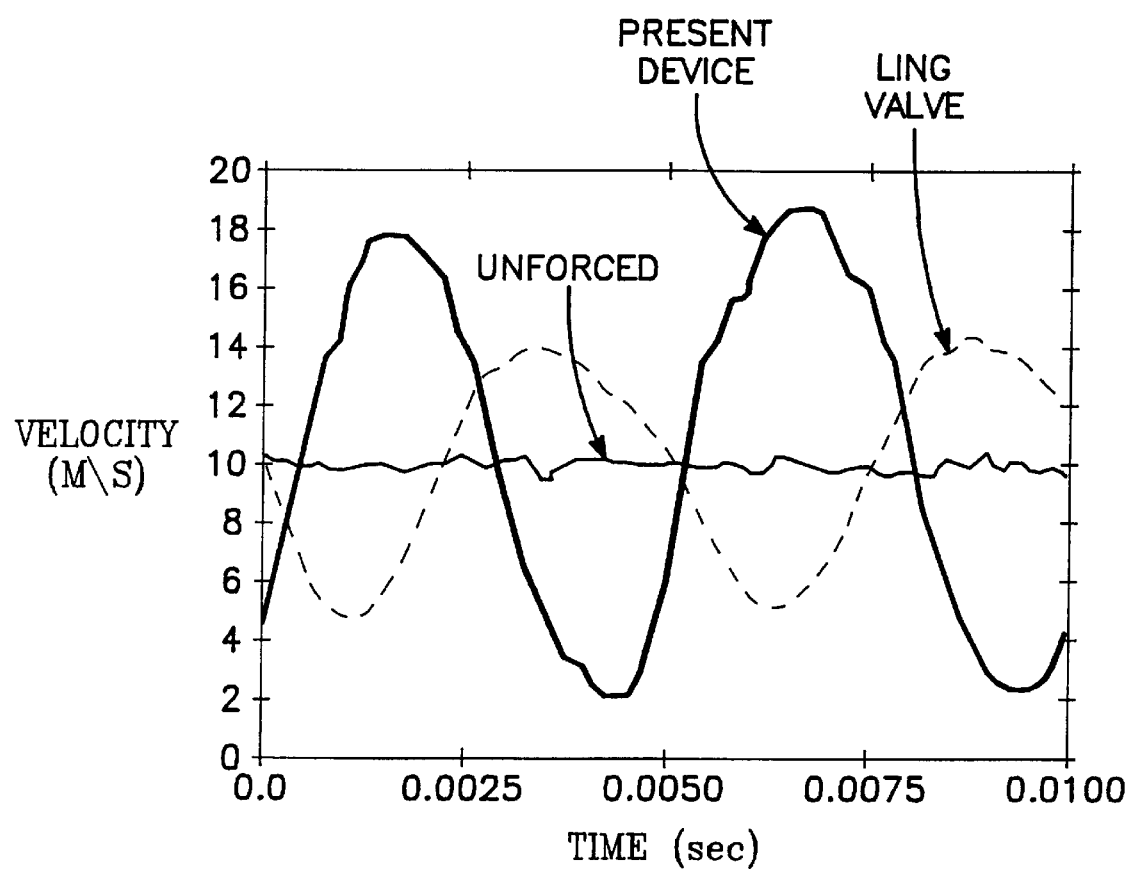
FIG. 4 is a graph illustrating the Velocity vs. Time between a Ling Valve and the device of the present invention.

FIG. 4 is a graph illustrating the velocity (in meters per second) as a function of time (in seconds) between a Ling valve of the prior art and the device of the present invention. FIG. 4 illustrates downstream velocities of the upstream fluid at 10 psig as the wafer 26 is driven by a sinusoidal signal with the amplitude of 200 volt and at frequency of 200 Hz. This was done at 33% actuator capacity. This can be compared to the unforced response corresponding to a constant gap width between the first side 35 of the wafer 26 and the second end 25 of the outlet conduit 20 when a fixed voltage is applied. Also shown in the graph is the forced response obtained with the Ling valve at a similar capacity as the present device. As seen in the graph, the device 10 of the present invention produced results superior to the Ling valve.

Figure 5:
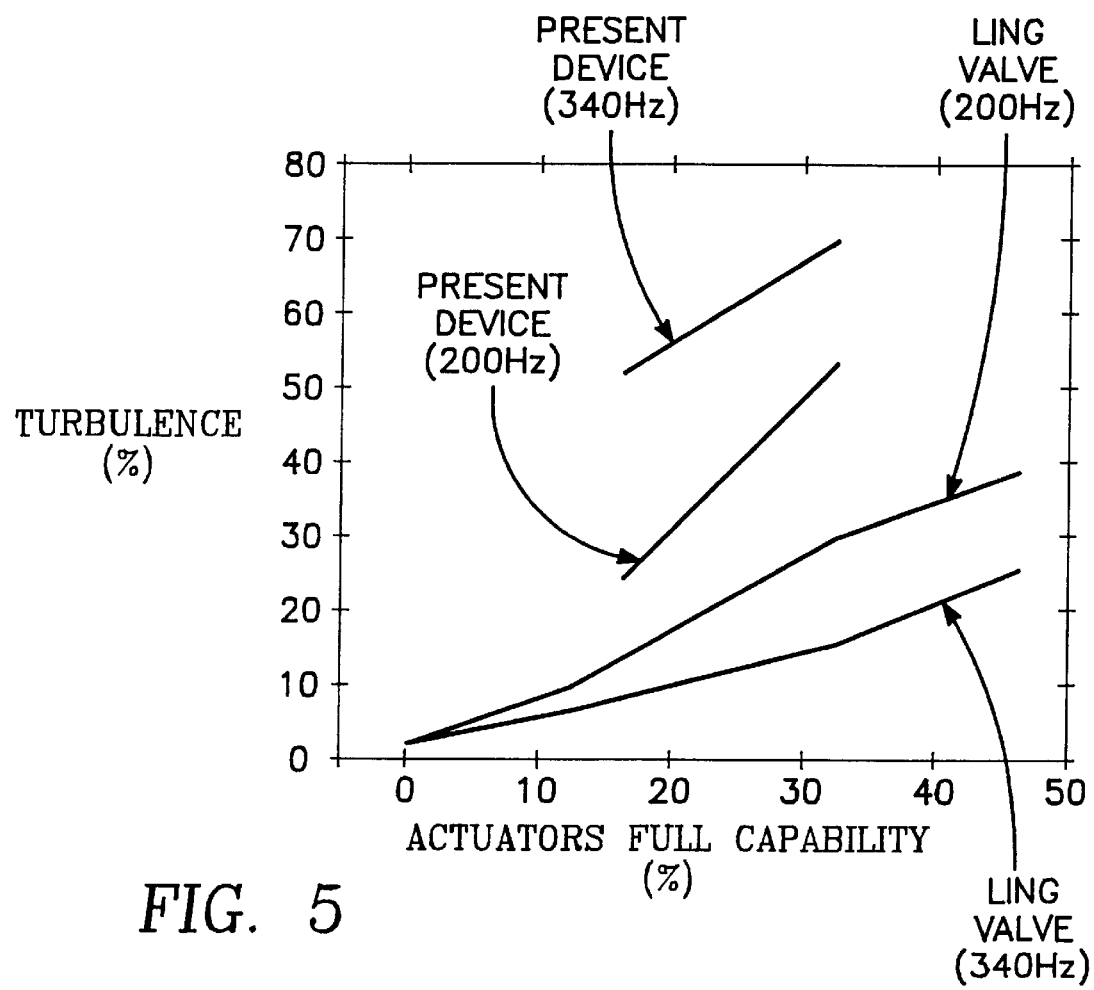
FIG. 5 is a graph illustrating the Exit Turbulence for Percent Turbulence vs. Percent of Full Capacity between a Ling Valve and the device of the present invention.

FIG. 5 is a graph illustrating the exit turbulence level in relation to the input capacity between a Ling valve and the device of the present invention. Both were applied to airflow through a 1.5 inch pipe with the mean velocity of 10 meters per second and at 200 Hz and 340 Hz. As seen in FIG. 5, the device 10 of the present invention is at least as effective as the Ling valve and it significantly outperforms the Ling valve at the higher frequency.

Figure 6:
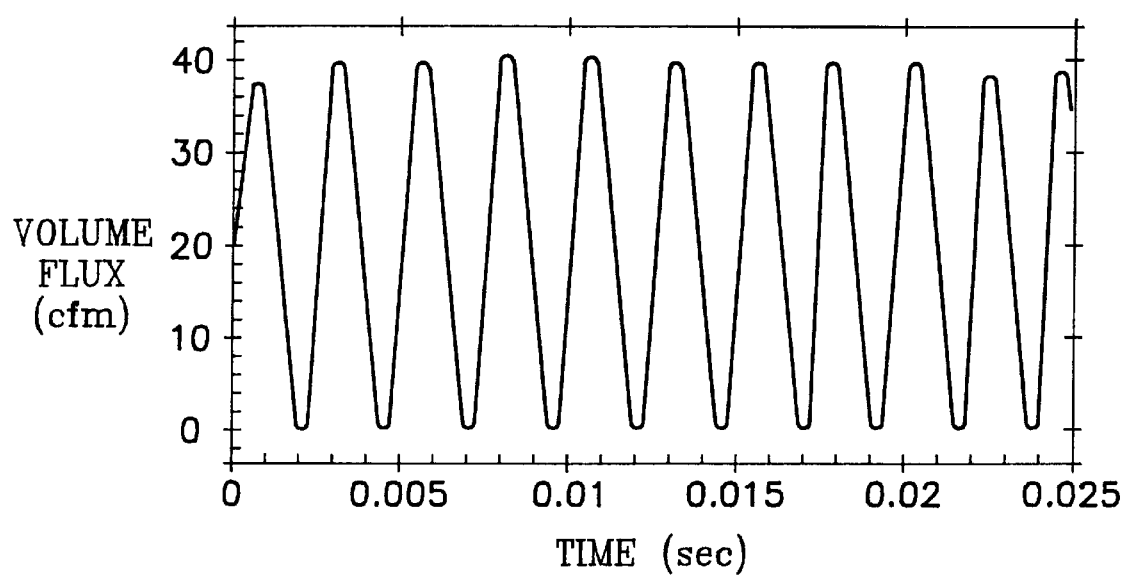
FIG. 6 is a graph illustrating the Volume Flux vs. Time for the device of the present invention at 450 Hz.

FIG. 6 is a graph illustrating the volume flux (in cubic feet per minute) as a function of time (in seconds) for an air flow excited with the device in the present invention driven at 450 Hz and at 33% power capacity. The graph displays reading of instantaneous flow rate based on hot-wire measurements. At 450 Hz, FIG. 6 clearly demonstrates the capability of the device 10 of the present invention at high frequencies that are beyond the operable regime of the Ling valve.

Figure 7:
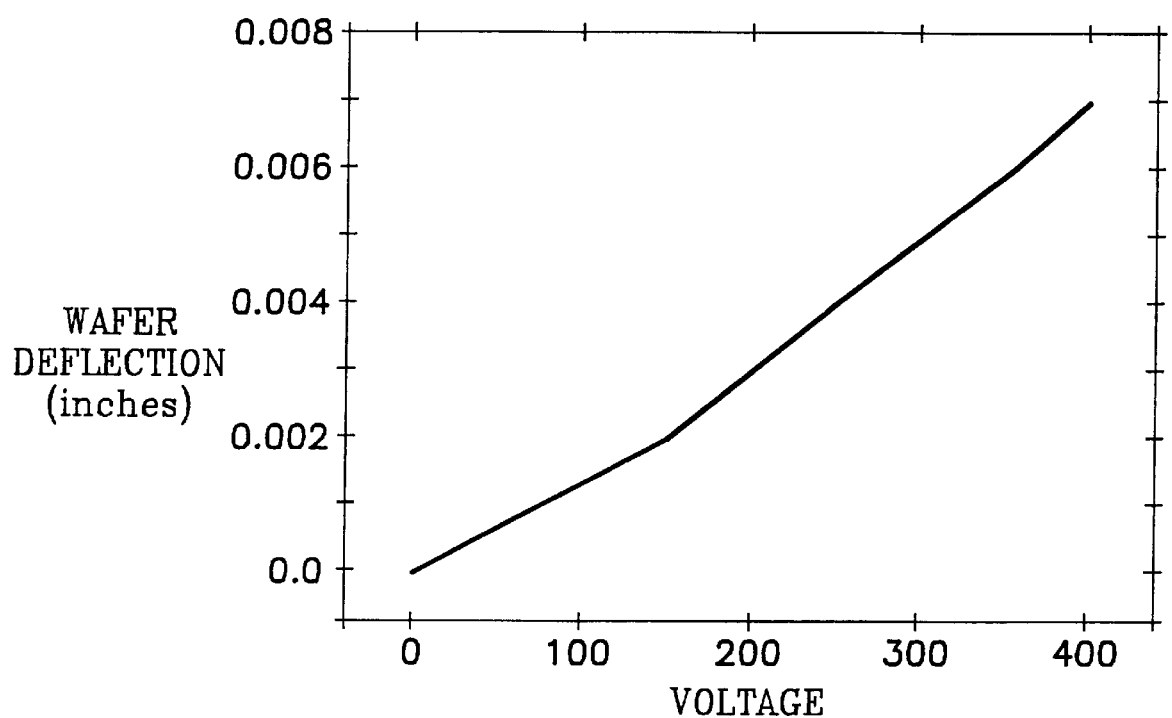
FIG. 7 is a graph illustrating the amount of the wafer deflection as a function of the amount of DC voltage applied to the wafer.

FIG. 7 is a graph illustrating the amount of wafer 26 deflection as a function of the amount of voltage applied to the wafer 26. Because the maximum wafer deflection increases with the voltage level, the amount of volume flux modulation also increases with the voltage.

Figure 8A:
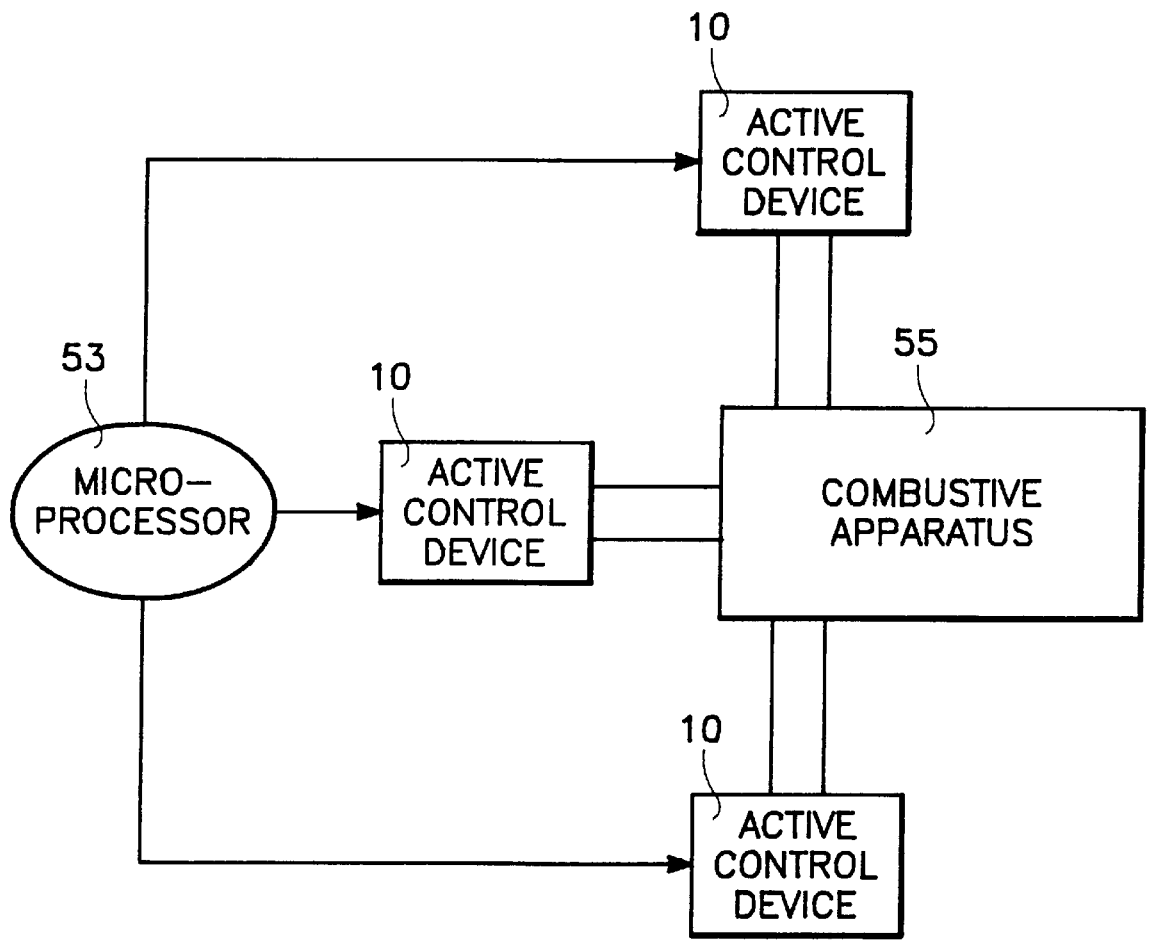
FIGS. 8a and 8b are schematic views of multiple devices of the present invention used in a single combustion chamber in open loop and closed loop configurations.
Figure 8B:
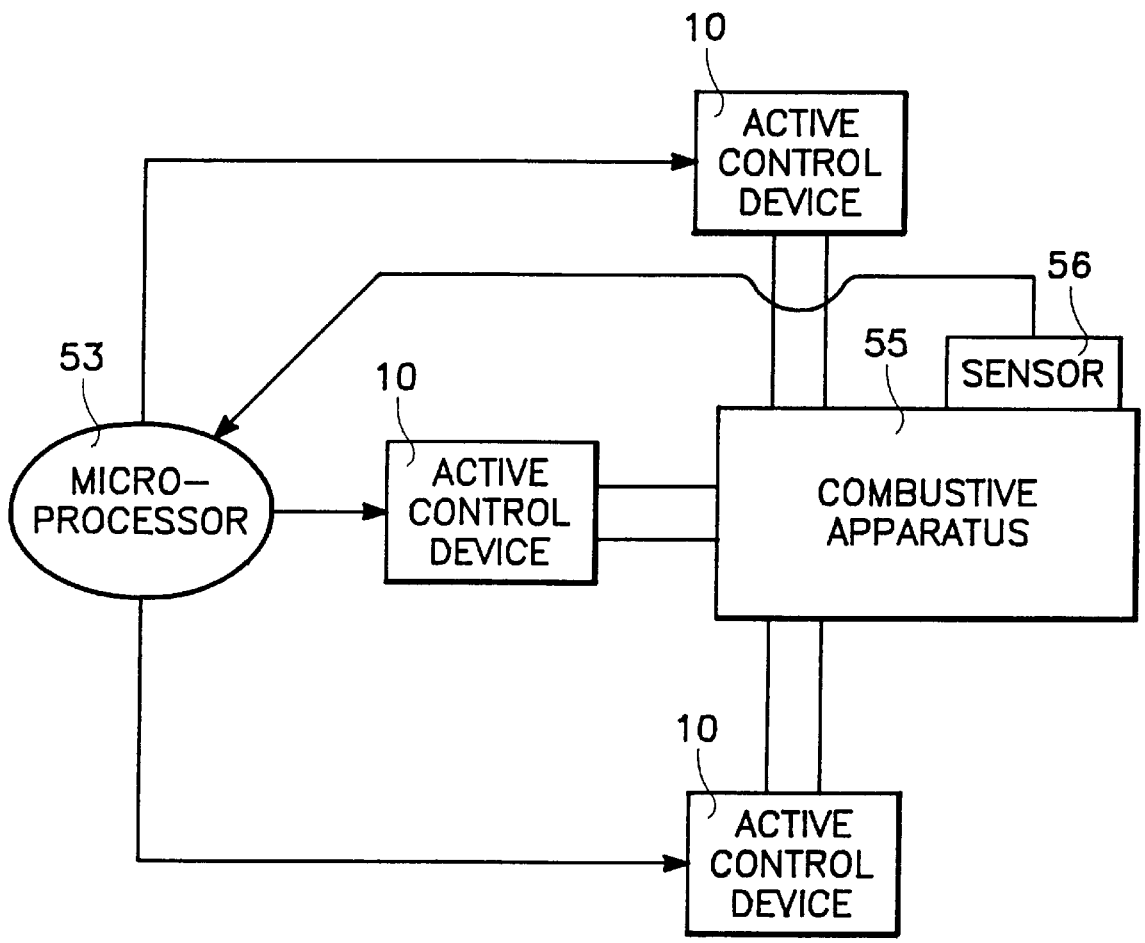

As shown in FIGS. 8a and 8b, a plurality of devices 10 may be used within a combustive apparatus 55. The devices 10 may be used to actively control air and/or fuel flow through the apparatus. FIG. 8a shows an open loop system that has an output signal from device 53 which controls the voltage waveform to wafer 26 in the devices 10. These devices 10 can be operated together or independently, at the same frequency or separate frequencies that result in the optimal performance of the combustion apparatus 55. FIG. 8b shows a closed-loop system that monitors the final combustion composition and pressure oscillations with sensors 56, inputs those signals to a microprocessor 57, and regulates the voltage to wafer 26 in the devices 10 to increase the efficiency of combustion. The frequencies and amplitudes are regulated in a manner by the microprocessor 57 such that a phase difference may occur between the device 10 that modulates the air flow and that of devices 10 that modulate the fuel flow such that an optimal performance level is achieved.

In operation, combustion is controlled in a combustion apparatus by providing an active control combustion device, supplying a pressurized combustive fluid into the combustive fluid chamber and applying an electric field to the wafer 26, wherein the wafer 26 is distorted. The combustive fluids may be fuel, air, oxidizer, and the like, and/or combinations thereof. Regulating the electric field is accomplished by monitoring the resultant combustion products, and adjusting the efficiency of the combustion through a computerized closed-loop system.

EXAMPLE 1

An apparatus as disclosed in U.S. Pat. No. 5,428,951 (Wilson et al.), the disclosure of which is herein incorporated by reference, is fitted with an active control device of the present invention for control of air vortices within the chamber. Efficiencies increase by a factor of 3.0 when the forcing frequency of the central airflow is 200 Hz.

EXAMPLE 2

An apparatus as disclosed in U.S. Pat. No. 5,428,951 (Wilson et al.), is fitted with an active control device of the present invention for control of air and fuel vortices within the chamber. The air flow regulation is regulated as discussed in Example 1, and the active control of the fuel flow regulation replaces loudspeakers, pulsed gas jets, adjustable inlets, or solenoid-type fuel injectors. The regulation of the air flow and fuel flow is synchronized through a closed-loop computer link. Efficiency within the chamber increases by a factor of 3.4 when the power output of the present device is maintained at 33 % of the actuators capacity and driven at 200 Hz.

EXAMPLE 3

A Rainbow® actuator of the present invention modulated

A Rainbow® actuator of the present invention modulated upstream fluids at rates up to 2 kHz under pressures of approximately 50 psi, with flow rates of approximately 100 SCFM. The electrical energy demand at maximum modulation was approximately 60 Watts. Displacement of the wafer is increased by 10 times over the prior art and loading increased by 100 times.

EXAMPLE 4

An apparatus for compact waste incinerator as disclosed in U.S. Pat. No. 5,361,710 (Gutmark et al.), the disclosure of which is herein incorporated by reference, is fitted with three active control devices of the present invention for control of air and fuel vortices within the chamber. Waste is mixed with fuel prior to entry into the chamber. The air flow regulation occurs through a single device, and the active control of the fuel flow regulation occurs through two devices which replace the disclosed loudspeakers, pulsed gas jets, adjustable inlets, or solenoid-type fuel injectors of U.S. Pat. No. 5,361,710. The regulation of the air flow and fuel flow is synchronized through a computer controlled closed loop system to optimize combustion efficiency by systematically adjusting the electrical modulation patterns and amplitudes of each actuator. The computer system senses downstream exhaust products and increases combustion efficiency. Efficiency of the system at 340 Hz increases by a factor of 2.4 when the turbulence of the main airflow increases from 30% to 72%. The formation of soot and other emissions decrease by a factor of 10. The actuator devices weigh approximately 20 times less than other systems providing comparable performance capability.

The foregoing summary, description, examples and drawings of the invention are not intended to be limiting, but are only exemplary of the inventive features that are defined in the claims.

What is claimed is:

1. An active control device comprising:

an outlet conduit having a first end and a second end, which is capable of fluid flow therethrough between the first and second ends of said outlet conduit with a pressurized fluid entering said outlet conduit through the second end of said outlet conduit and exiting through the first end of said outlet conduit, said pressurized fluid being pressurized within a range which is from about 50 psi to about 100 psi;

a piezoelectric wafer having a first side and a second side, with the first side of said piezoelectric wafer abutting the second end of said outlet conduit when said piezoelectric wafer is placed in an equilibrium state, and preventing fluid passage into said outlet conduit;

a fluid receptacle forming a chamber, said chamber containing said piezoelectric wafer and the second end of the outlet conduit, said chamber having an inlet opening through which said pressurized fluid can be brought into said chamber; and, means for applying an electric field at a selected frequency to said piezoelectric wafer, wherein the application of said electric field to said piezoelectric wafer distorts said piezoelectric wafer creating a gap between the first side of said piezoelectric wafer and the second end of said outlet conduit allowing said pressurized fluid to pass through said gap to the first end of said outlet conduit to form a plurality of coherent vortices containing said pressurized fluid, said plurality of coherent vortices being formed by said active control device at said selected frequency;

the selected frequency of said electric field having a frequency range from about 400 Hertz to about 2000 Hertz;

a housing having said chamber contained therein;

an upper support ring and a lower support ring suspended inside said chamber by a plurality of support rods that are attached to said housing; and said piezoelectric wafer being sandwiched between said upper support ring and said lower support ring around the circumference of said piezoelectric wafer, said piezoelectric wafer being supported by said upper support ring and said lower support ring at a predetermined position relative to said outlet conduit.

2. The device of claim 1, wherein said piezoelectric wafer comprises an electric-reactive material selected from the group consisting of polymeric compositions, ceramic compositions, and combinations thereof.

3. The device of claim 1 wherein said piezoelectric wafer is from about 4 inches in diameter to about 10 inches in diameter.

4. The device of claim 2 wherein said piezoelectric wafer is capable of an axial displacement of from about 0.05 inches to about 0.20 inches.

5. The device of claim 1 wherein said means for applying an electric field at a selected frequency to said piezoelectric wafer comprises a power supply connected to said piezoelectric wafer to provide a sinusoidal signal to said piezoelectric wafer oscillating said piezoelectric wafer at said selected frequency.

6. The device of claim 11 wherein said sinusoidal signal has a voltage in a range of from about −200 volts to about +400 volts.

7. An active control device comprising:

an outlet conduit having a first end and a second end, which is capable of fluid flow therethrough between the first and second ends of said outlet conduit with a pressurized fluid entering said outlet conduit through the second end of said outlet conduit and exiting through the first end of said outlet conduit, said pressurized fluid being pressurized in a range which is from 50 psi to about 100 psi;

a piezoelectric wafer having a first side and a second side, with the first side of said piezoelectric wafer abutting the second end of said outlet conduit when said piezoelectric wafer is placed in an equilibrium state, and preventing fluid passage into said outlet conduit;

a fluid receptacle forming a chamber, said chamber containing said piezoelectric wafer and the second end of the outlet conduit, said chamber having an inlet opening through which said pressurized fluid can be brought into said chamber;

a power supply coupled to said piezoelectric wafer, said power supply applying an electric field having a frequency range from about 400 Hertz to about 2000 Hertz to said piezoelectric wafer, wherein the application of said electric field to said piezoelectric wafer distorts said piezoelectric wafer creating a gap between the first side of said piezoelectric wafer and the second end of said outlet conduit allowing said pressurized fluid to pass through said gap to the first end of said outlet conduit to form a plurality coherent vortices containing said pressurized fluid, said plurality of coherent vortices being formed by said active control device within at a selected frequency within said frequency range;

a housing having said chamber contained therein;

an upper support ring and a lower support ring suspended inside said chamber by a plurality of support rods that are attached to said housing; and said piezoelectric wafer being sandwiched between said upper support ring and said lower support ring around the circumference of said piezoelectric wafer, said piezoelectric wafer being supported by said upper support ring and said lower support ring at a predetermined position relative to said outlet conduit.

8. The device of claim 7, wherein said piezoelectric wafer comprises an electric-reactive material selected from the group consisting of polymeric compositions, ceramic compositions, and combinations thereof.

9. The device of claim 7 wherein said piezoelectric wafer is from about 4 inches in diameter to about 10 inches in diameter.

10. The device of claim 7 wherein said piezoelectric wafer is capable of an axial displacement of from about 0.05 inches to about 0.20 inches.

11. The device of claim 7 wherein said power supply provides a sinusoidal signal to said piezoelectric wafer oscillating said piezoelectric wafer at said selected frequency within said frequency range.

12. The device of claim 11 wherein said sinusoidal signal has a voltage in a range of from about −200 volts to about +400 volts.

* * * * *